United States Patent Office 3,783,114
Patented Jan. 1, 1974

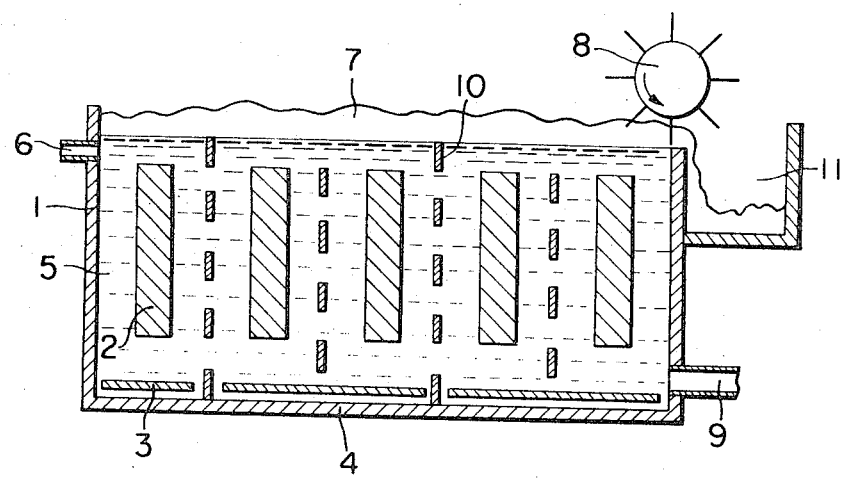

3,783,114
METHOD OF ELECTROLYTIC TREATMENT OF WASTE WATER
Masahito Ishii and Minoru Ichiki, Tokyo, Japan, assignors to Mitsui Mining & Smelting Co., Ltd., Chuo-ku, Tokyo, Japan
Filed Feb. 18, 1972, Ser. No. 227,594
Claims priority, application Japan, Feb. 23, 1971, 46/8,856
Int. Cl. C02c 5/12
U.S. Cl. 204—149
7 Claims

ABSTRACT OF THE DISCLOSURE

A method of electrolytic treatment of industrial waste water, which comprises the steps: electrolysis is conducted by introducing said industrial waste water as the electrolyte into an electrolytic cell equipped with vertically suspended anodes and horizontal cathodes disposed close to the bottom of the cell; the scum arising from the electrolysis of the heavy metal ions, fats and oils including animal, vegetable and mineral oils, various fine, solid floating matters, etc. is taken out from the upper part of the electrolytic cell; and the electrolytically purified waste water is taken out from the lower part of the electrolytic cell.

BACKGROUND OF THE INVENTION (a) Field of the invention

The present invention relates to a method of treating the waste water discharged in great quantities from the metal processing shop, plating shop, oil and fat factory, etc. by electrolysis.

(b) Description of the prior art

The method of removing the polluting substances within a waste water such as the ions of heavy metals like iron and so forth, fats and oils including animal, vegetable and mineral oils, other various fine, solid floating matters, etc. by means of electrolysis has been known for a fairly long time. Although the mechanism of the purification of waste water by virtue of the electrolytic treatment thereof is yet to be clarified, it is presumed to be as follows: when the waste water is employed as the electrolyte, the polluting matters, for instance, the heavy metal ions contained in the waste water are attracted to the cathode together with the aluminum ions coming out from the aluminum anode and they are reduced to the metal or combine with the hydroxyl ions existing in the waste water (drainage) to become a hydroxide; the thus produced metal or hydroxide aggregates into floc together with the aluminum hydroxide existing in the vicinity of the cathode; subsequently, this floc is made to float by virture of the bubbles of hydrogen gas generated by the electrolysis to be concentrated in the form of scum on the surface of the electrolyte. In application of this electrolytic method, the electrolytic cell is usually so constructed as to be equipped with several sets of vertical anode and cathode disposed face to face alternately. In case of the conventional electrolytic cell as above, however, it is attended with such defects that the oxide and slime adhere to the surface of the electrodes to increase the cell voltage with the passage of time, and, as a result, not only its operation becomes hazardous but also the consumption of electricity increases or the treating efficiency lowers, thereby making it difficult to perform the electrolytic treatment successfully.

As a means of eliminating the foregoing defects, it has also been proposed to put some fluoride or the like into the electrolytic cell. However, this means is also accompanied by undesirable effects such as the increase in cost, the occurrence of residual fluoride, etc., and, accordingly, there has been a demand for a technical settlement of these problems.

SUMMARY OF THE INVENTION

One object of the present invention is to provide a method of electrolytically treating waste water without bringing about a rise in the cell voltage.

Another object of the present invention is to provide a method of electrolytic treatment of waste water, which renders it possible to collect efficiently the polluting substances, such as fats and oils, metal ions, various fine, solid floating matters, etc., contained in the waste water.

A further object of the present invention is to provide a method of electrolytic treatment of waste water, which renders it possible to treat said waste water continuously.

The present invention relates to a method of treating the industrial waste water comprising the steps: conducting the electrolysis by introducing said industrial waste water as the electrolyte into an electrolytic cell equipped with vertically suspended anodes and the horizontal cathodes disposed close to the bottom of the cell; removing the scum arising from the electrolysis (that is, the polluting substances coming up through the electrolyte to float to the surface thereof) from the upper part of the electrolytic cell; and discharging the purified waste water, that is, the electrolytically purified liquid, from the lower part of said cell. According to the present method, the feed of waste water and the discharge of electrolytically purified liquid are usually performed successively. Therefore, as the apparatus for electrolytic treatment for use in practicing this method, such one as having the construction provided with an electrolytic cell equipped with the vertically suspended anodes and the horizontally disposed cathodes near the bottom of the cell, and inlet for the waste water and a scum-raking device which are installed above the electrolytic cell, and an outlet for the purified liquid which is installed in the vicinity of the bottom of the electrolytic cell, is suitable.

BRIEF DESCRIPTION OF THE DRAWING

The appended drawing is a diagrammatic cross-sectional view of an apparatus for electrolytic treatment which may be utilized in practicing the method of the present invention.

As shown in this drawing, the electrolytic cell 1 is so devised that only the anodes 2 are suspended vertically therein while the cathodes 3 are disposed horizontally along the bottom of electrolytic cell 4, not face to face with the anodes, whereby the electrodes practically form an inverted T-shape. The cathodes 3 may be directly laid on the bottom of electrolytic cell 4 in case the elecrolytic cell per se is non-conductive and the bottom thereof is horizontal, or some insulating material may be interposed between the cathodes 3 and the bottom of electrolytic cell 4. In case the electrolytic cell per se is made of a metal (that is, a conductive material), it will do either to insulate the side walls of electrolytic cell so that the bottom of electrolytic cell serves as the cathode, or to provide negative plates separately therefor. The spacing between the anode 2 and the cathode 3 can be appropriately determined depending on the kind of the waste water, the current density, and so forth.

DETAILED DESCRIPTION OF THE INVENTION

Hereunder will be given a detailed explanation of the present invention by reference to the appended drawing.

As stated above, on the occasion of practicing the method under the present invention, an electrolytic cell equipped with vertically suspended anodes and horizontal cathodes disposed close to the bottom of electrolytic cell, such as exemplified in the drawing, is employed. In this case, the waste water 5 containing fats and oils, heavy metal ions, various solid floating matters, etc. is supplied to the electrolytic cell 1 from above. The floc and the anodic oxide arising from the electrolysis of the waste water 5 supplied through the feed inlet 6 come rapidly to the upper part of the electrolytic cell without adhering to the lower part of the anodes 2 and the cathodes 3. As a result, there is hardly observed any rise in the cell voltage. One of the reasons therefor is as follows: as merely the lower part of the anode 2 which is close to the surface of the cathode 3 intensely discharges electricity and gets dissolved, this portion is free from adhesion of the anodic oxide or floc arising from the electrolysis. Further, as very fine bubbles of hydrogen gas are generated from all over the upper surface of the cathode 3 and ascend, no floc adheres to the cathode 3. The fats and oils and various fine, solid floating matters, not to mention of the floc, absorb to said bubbles generated from the surface of the cathode, ascend through the electrolyte and are accumulated in the upper part thereof to become the polluting substance, that is, the scum 7. This scum is collected and removed by means of the scum-raking device 8 installed above the electrolytic cell, while the purified waste water (or purified liquid) is discharged from the outlet 9 provided in the vicinity of the bottom of electrolytic cell 4.

The mechanism of the electrolytic treatment of the waste water according to the present invention is as set forth above, and the material employed for the anode 2 includes aluminum, aluminum alloy, iron, etc. shaped in plate or rod. Meanwhile, as the material employed for the cathode 3, copper, iron, nickel, stainless steel, etc. are applicable, and it is preferable to be shaped into non-perforated plate, perforated plate, net, grating or the like.

As to the construction of the electrolytic cell, it is more preferable to divide it into plural compartments by means of partitions 10—10 . . . , each compartment being provided with the aforementioned anode and cathode. Each partition is usually composed of a perforated or non-perforated plate consisting of a material insoluble in the waste water to be treated and non-conductive, such as plastics. The size of the respective depends on the concentration of the waste water concerned, the treating efficiency required, and other conditions. Although the anode 2 gets dissolved into the electrolyte as a result of the electrolytic treatment, in case the anode 2 is plate-shaped or rod-shaped, it is possible to maintain a prescribed spacing between the anode 2 and the cathode 3 by means of gradually lowering said anode as long as the length of the conducting wire permits.

The present apparatus may be provided with two or more inlets 6 depending on the treating efficiency thereof. The purified liquid is taken out through the outlet 9 provided in the vicinity of the bottom of electrolytic cell 4 and this liquid practically contains no heavy metal or ions thereof, fats and oils and floating solid matters. The scum 7 accumulated in the upper part of the electrolytic cell is collected in the receptacle 11 by means of the scum-raking device 8, and subsequently the oil content thereof is burnt after dehydration, while the metal content can be recovered by treating the solid matters contained therein. Furthermore, each compartment of the electrolytic cell is not always required to have one anode and one cathode: the number of anodes and cathodes can be optionally determined. The inlet 6 for the waste water is desirable to be installed at a place above the electrolytic cell 1 and away from the aforesaid outlet 9 for the purified liquid as far as possible in view of the location of said outlet 9. Besides, said outlet 9 is desirable to be installed in the vicinity of the bottom of electrolytic cell 4. This is because of the fact that the waste water is in the state of having been purified to the highest degree in the vicinity of the cathode 3 horizontally laid close to the bottom of electrolytic cell. It goes without saying that said outlet 9 can be provided in plural number depending on the treating efficiency of the apparatus. The scum-raking device 8 suffices to be capable of removing the scum accumulated in the upper part of the electrolyte and taking it in the receptacle for scum 11: it will do to employ such one as having plural rotary blades designed to rotate in a fixed direction or one having at least one long plate capable of reciprocating motion.

The waste water purified as above (that is, a purified liquid) is practically free of the heavy metal or ions thereof, fats and oils and various floating solid matters: but, if there should remain any other untreated component dissolved therein, it will do to separate such component from said purified liquid through precipitation by the known method of treatment such as application of the oxidizer, reducing agent, etc. or the neutralizing treatment, etc.

According to the method of the present invention, not only there takes place no rise in cell voltage due to continuous operation of the electrolysis but also the bubbles generated from all over the upper surface of the cathode show a high efficiency in absorbing to the polluting substances such as the floc, fats and oils, etc. in the vicinity of the cathode so that they scarcely ascend wastefully. And, to speak of the individual floc in the course of ascent, the generated bubbles are so fine that the total volume of these bubbles absorbed to the floc is little. As a result, the present method ensures the effect that more polluting substances can be treated with less quantity of electricity as compared with the method employing the conventional way of disposing the electrode plates. Moreover, the present method renders it possible to take out the purified liquid continuously from the vicinity of the bottom of electrolytic cell, so that not only it is possible to obtain the purified liquid continuously but also a scum containing less water can be obtained from the upper part of the electrolyte. Accordingly, the present method does not require any specific apparatus for separating the purified liquid and the scum such as are popular in the conventional method wherein the mixture of the purified liquid and the scum is made to overflow the electrolytic cell. Further, according to the present method, like the known methods of electrolytic treatment, it is possible to treat not only the metal ions but also oils as well as such emulsions which are hard to separate by any other means.

DESCRIPTION OF THE PREFERRED EMBODIMENTS

Example 1

An electrolytic cell 1 of 300 l. in capacity divided into 5 rooms by 4 partitions 10 as shown in the appended drawing and provided with the cathodes 3 made of iron plate (said cathodes measuring 600 mm. x 800 mm. x 2 mm. in total) disposed horizontally along the bottom of cell 4, the anodes 2 consisting of a couple of aluminum plates (measuring 400 mm. x 300 mm. x 10 mm. each) disposed vertically within each room and a raking device 8 disposed above the cell so as to rake continuously the scum 7 generated therein, was filled with 240 l. of a waste water 5 coming from a plating shop and comprising 0.5 p.p.m. of zinc, 0.1 p.p.m. of nickel, 3.0 p.p.m. of chromium, 2.6 p.p.m. of copper and a pH-value of 7.8. Subsequently, electrolysis was conducted by applying direct current of 6 amperes in toto. After one hour following the start of electrolysis, the aforesaid waste water coming from the plating shop was continuously supplied at the rate of 240 l./hr. from the inlet 6 for waste water to the upper part of the leftmost room of the electrolytic cell as shown in the drawing, while the resulting purified liquid was continuously taken out through the outlet 9 for purified liquid installed in the vicinity of the bottom of the rightmost room. The scum 7 which had come to the upper part of the cell was raked out as occasion arose. Samples of the purified liquid were picked directly from from the outlet 9 for purified liquid during the period of one hour following the application of electric current, and thenceforth were picked from the purified liquid discharged. When these samples were analyzed and further the cell voltage was measured to examine the rising rate thereof, the results were as shown in Table 1 below.

As may be clearly understood from this table, almost all of the heavy metals can be efficiently eliminated by the present method, and there is scarcely observed any rise in the cell voltage even after 10 days' consecutive electrolysis. It is to be noted in this connection that the same tendency was observed even when the materials for the anode as well as the cathode were modified variously.

TABLE 1.—RESULTS OF TREATMENT OF WASTE WATER FROM PLATING SHOP

| Time following the start of electrolysis | Concentration of purified liquid (p.p.m.) | | Rate of rise in cell voltage |
|---|---|---|---|
| | Chromium | Copper | |
| At the start of electrolysis | 3.0 | 2.6 | 1.00 |
| 20 min. after | 0.7 | 0.6 | 1.00 |
| 40 min. after | 0.2 | 0.1 | 1.00 |
| 1 hr. after | 0.2 | 0.0 | 1.00 |
| 24 hrs. after | 0.3 | 0.1 | 1.00 |
| 48 hrs. after | 0.2 | 0.0 | 1.01 |
| 96 hrs. after | 0.1 | 0.0 | 1.02 |
| 144 hrs. after | 0.2 | 0.0 | 1.01 |
| 240 hrs. after | 0.2 | 0.1 | 1.08 |

REMARKS: The cell voltage at the start of electrolysis was taken as 1.00.

Example 2

The same electrolytic cell as that employed in Example 1 was filled with 240 l. of an oil-containing emulsion-type waste water (having a mean oil concentration of 280 p.p.m.) arising from a foundry. Subsequently, electrolysis was conducted by applying direct current of 5 amperes in toto. After 2 hours following the start of electrolysis, the aforesaid waste water coming from the foundry was continuously supplied to the electrolytic cell at the rate of 120 l./hrs., while the resulting purified liquid was continuously taken out therefrom. The oil-containing scum which had come to the upper part of the cell was continuously raked out. Samples of the purified liquid were picked directly from the outlet for purified liquid during the period of 2 hours following the application of electric current, and thenceforth were picked from the purified liquid discharged. When these samples were analyzed and further the cell voltage was measured to examine the rising rate thereof, the results were as shown in Table 2 below.

As may be clearly understood from this table, the oil content of the waste water can be efficiently eliminated by th present method, and there is scarcely observed any rise in the cell voltage even after 25 days' consecutive electrolysis. It is to be noted in this connection that the same tendency was observed even when the materials for the anode as well as the cathode were modified variously.

TABLE 2.—RESULTS OF TREATMENT OF WASTE WATER FROM FOUNDRY

| Time following the start of electrolysis | Concentration of oil in purified liquid (p.p.m.) | Rate of rise in cell voltage |
|---|---|---|
| At the start of electrolysis | 280 | 1.00 |
| 2 hrs. after | 3.0 | 0.99 |
| 10 hrs. after | 3.4 | 1.00 |
| 24 hrs. after | 2.8 | 1.00 |
| 30 hrs. after | 5.3 | 1.01 |
| 48 hrs. after | 3.0 | 1.01 |
| 72 hrs. after | 3.7 | 1.01 |
| 120 hrs. after | 3.9 | 1.01 |
| 240 hrs. after | 4.7 | 1.07 |
| 360 hrs. after | 3.3 | 1.10 |
| 480 hrs. after | 5.9 | 1.06 |
| 600 hrs. after | 5.3 | 1.06 |

REMARKS: The cell voltage at the start of electrolysis was taken as 1.00.

What is claimed is:

1. A process for the electrolytic purification of industrial waste water containing impurities of metal ions, fats and oils and/or suspended solids, which comprises placing industrial waste water in an electrolytic cell having vertically disposed anodes made of a material selected from the group consisting of aluminum, aluminum alloy and iron, said cell having horizontally disposed cathodes disposed directly below said anodes at or adjacent to the bottom of the cell, said cathodes being made of a material selected from the group consisting of copper, iron, nickel and stainless steel; electrolyzing the waste water in the cell so that the lower ends of the anodes dissolve in the waste water being treated and produce a floc therein and hydrogen gas bubbles form at said cathodes and rise through the waste water being treated whereby there forms on the upper surface of the waste water in the cell a layer of scum consisting essentially of said floc, said bubbles and said impurities; removing purified waste water from the lower part of the cell; and removing the scum from the upper part of the cell.

2. A process according to claim 1, in which the industrial waste water is continuously flowed into one end of the cell and the purified waste water is continuously removed from the other end of the cell.

3. A process according to claim 1, in which the anodes are of plate-like or rod-like shape.

4. A process according to claim 3, including the step of progressively lowering the anodes in the cell as electrolysis progresses to maintain a substantially constant spacing between said anodes and said cathodes.

5. A process according to claim 1, wherein the cathodes are nonperforated plates, perforated plates, net-like plates or grating-like plates.

6. A process according to claim 1, in which the bottom wall of the cell functions as said cathodes.

7. A process according to claim 1, in which said anodes are made of aluminum or aluminum alloy.

References Cited

UNITED STATES PATENTS

| Re. 26,329 | 1/1968 | Hougen | 204—149 |
| 398,101 | 2/1889 | Webster, Jr. | 204—149 |
| 535,802 | 3/1895 | Lugo | 204—152 |
| 914,251 | 3/1909 | Ellis et al. | 204—149 |
| 937,210 | 10/1909 | Harris | 204—149 |
| 1,146,942 | 7/1915 | Landreth | 204—149 |
| 1,507,121 | 9/1924 | Landreth | 204—149 |
| 3,347,786 | 10/1967 | Baer et al. | 204—149 X |
| 3,458,414 | 7/1969 | Crane et al. | 204—149 |
| 3,543,936 | 12/1970 | Abson et al. | 204—149 X |

JOHN H. MACK, Primary Examiner

A. C. PRESCOTT, Assistant Examiner

U.S. Cl. X.R.

204—152; 210—44